Figures 1, 2:
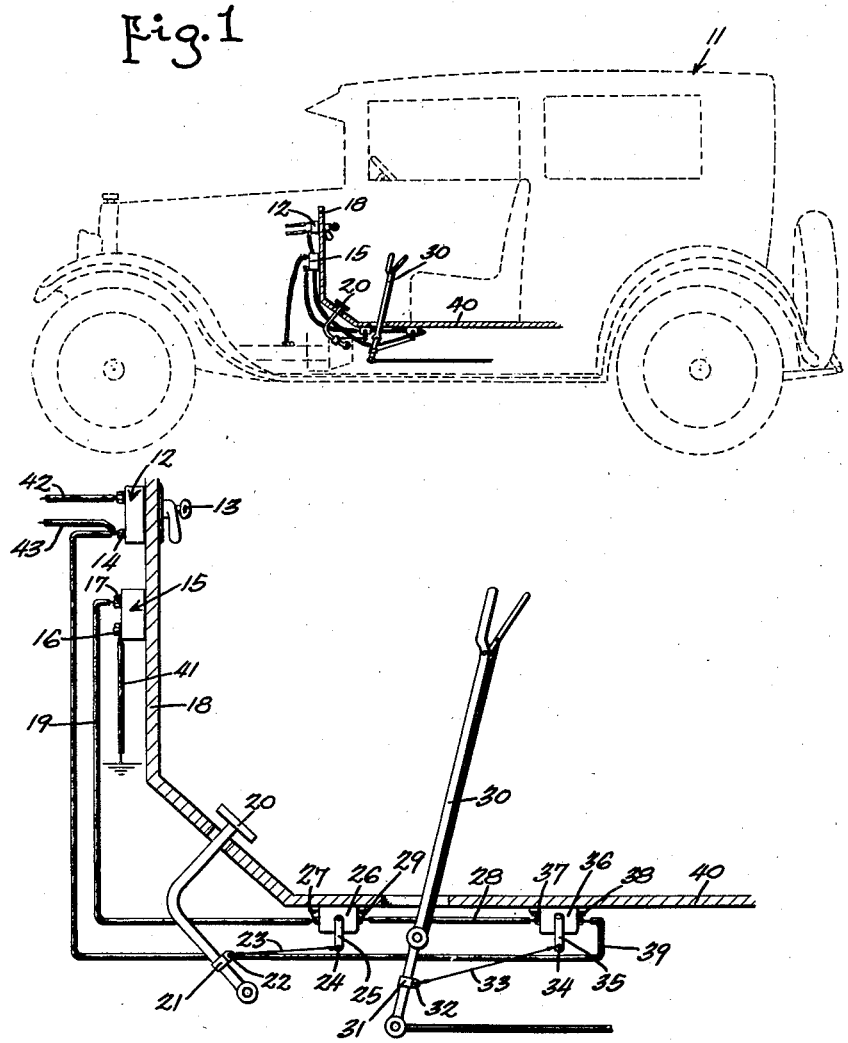

Dec. 3, 1929.　　　A. SHERWOOD　　　1,737,774

ALARM SIGNAL

Filed Aug. 6, 1928

Agnes Sherwood
Inventor
by Smith and Freeman
Attorneys

Patented Dec. 3, 1929

1,737,774

UNITED STATES PATENT OFFICE

AGNES SHERWOOD, OF MASSILLON, OHIO

ALARM SIGNAL

Application filed August 6, 1928. Serial No. 297,688.

My invention relates to alarm signals, and more particularly to alarm signals for use on automobiles, and the principal object of my invention is to provide a new and improved device of this type.

Sometimes when starting an automobile the driver, through inadvertence, neglects to release the hand brake before the automobile is under way, and in many instances continues to drive a considerable distance with the hand brake set. The driver usually is unapprised of such a condition, until he seeks to investigate the cause of the failure of the automobile to attain a proper speed, or until the odor of burning brake bands warns him of such condition. Devices have been proposed to warn the driver that the hand brake has not been released, but these are not entirely satisfactory, since it is customary to use either a combination where the circuit is closed whenever the hand brake is on and the clutch depressed, and consequently a combination where children playing in the car can sound the alarm, a most undesirable condition, or a combination where the only switch in circuit with the hand brake switch is the ignition switch, and consequently a combination where any use of the hand brake while the ignition is on, as on a long hill to relieve the service brake, will sound the alarm, again a most undesirable condition. Applicant's invention avoids these objections and provides a simple and effective manner of warning the driver that the hand brake is in brake-on position by causing a buzzer to sound whenever, after turning on the ignition switch, the clutch is depressed while the hand brake is still in brake-on position. It will be noticed that applicant's invention causes the alarm signal to apprise the driver before the automobile is under way that the brake is in brake-on position.

In the drawings accompanying this specification and forming a part of this application I have shown, for the purposes of illustration, one form which my invention may assume, and in these drawings:

Figure 1 is a phantom view of an automobile showing the embodiment of my invention, while Figure 2 shows parts of the automobile and the wiring of my invention drawn on a larger scale.

I show my invention as applied to an automobile 11 having an ordinary ignition switch 12 positioned on a dash board 18, connected by a conductor 42 to a suitable source of current (not shown), and having a key 13 for controlling the flow of current to the ignition conductor 43 from a terminal 14 on the ignition switch 12.

A buzzer 15 provided with terminals 16 and 17 is attached to the motor-side of a dash board 18, the terminal 16 being connected to a conductor 41 providing a ground contact, and the terminal 17 being connected to a conductor 19. On the clutch pedal 20 is secured a clip 21 provided with an aperture 22 having secured therein one end of a wire 23 the other end of which is secured in an aperture 24 in an arm 25 of a spring switch 26 attached to the bottom side of the floor board 40 of the automobile 11. On a hand brake lever 30 a clip 31 is provided with an aperture 32 having secured therein one end of a wire 33 the other end of which is secured in an aperture 34 in an arm 35 of a spring switch 36 attached to the bottom side of the floor board 40 of the automobile 11. The conductor 19 leading from the terminal 17 of the buzzer 15 is attached to a terminal 27 on the spring switch 26 while a conductor 28 leads from a second terminal 29 on the spring switch 26 to a terminal 37 of the spring switch 36 and a conductor 39 leads from a second terminal 38 on the spring switch 36 to the terminal 14 of the ignition switch 12.

The spring switch 26 is so positioned and adjusted in cooperation with the clutch pedal 20 that only when the clutch pedal 20 is depressed are the terminals 27 and 29 connected, and the spring switch 36 is so positioned and adjusted in cooperation with the hand brake lever 30 that only when the hand brake lever 30 is in brake-on position are the terminals 37 and 38 connected.

It will be apparent to one skilled in the art that when the clutch pedal 20 is not depressed, the hand brake lever 30 is in brake-on position, and the ignition switch 12 is turned on, no current will pass from the ignition switch 12 to operate the buzzer 15. It will also be apparent that when such an arrangement of the various parts exists the depressing of the clutch pedal 20 will establish a circuit between the switch 12 and the buzzer 15 causing the buzzer to sound warning that the brake lever 30 should be released from brake-on position thus breaking the circuit between the ignition switch 12 and the buzzer 15 and thereby causing the buzzer 15 to cease operating.

Under these circumstances those skilled in the art will realize that I have produced a new and improved alarm signal, and accordingly that I have accomplished at least the principal object of my invention. At the same time those skilled in the art will realize that the particular application of my invention herein shown and described embodies advantages other than those specifically pointed out or suggested herein, and also that this particular embodiment of my invention may be variously changed and modified without departing from the spirit of my invention or sacrificing these advantages, also that my invention, and the particular embodiment thereof herein disclosed, are adaptable to and have uses other than those described or suggested herein, and it therefore will be understood that the disclosure herein is illustrative only, and that my invention is not limited thereto.

I claim:

An alarm signal, for use on an automobile having a brake lever and a clutch pedal and a source of current and an ignition switch, comprising: a signal means for giving an alarm; a brake-switch controlled by said hand brake lever and closed when said hand brake lever is in brake-on position; a clutch-switch controlled by said clutch pedal and closed when said clutch pedal is in clutch-out position; and conductors connecting said signal means and said brake-switch and said clutch switch and said ignition switch to said source of current in series.

In testimony whereof I hereunto affix my signature.

AGNES SHERWOOD.